(12) United States Patent
Tian et al.

(10) Patent No.: US 7,944,388 B1
(45) Date of Patent: May 17, 2011

(54) QUANTIZATION SPLITTING MULTIPLE DESCRIPTION ENCODER

(75) Inventors: Chao Tian, Morris Plains, NJ (US); Jun Chen, Hamilton (CA)

(73) Assignee: AT&T Intellectual Property I, L.P.

( * ) Notice: Subject to any disclaimer, the term of this patent is extended or adjusted under 35 U.S.C. 154(b) by 0 days.

(21) Appl. No.: 12/633,078

(22) Filed: Dec. 8, 2009

(51) Int. Cl.
*H04N 7/26* (2006.01)
(52) U.S. Cl. ......... 341/200; 341/155; 341/143; 341/156
(58) Field of Classification Search .................. 341/155, 341/143, 200, 156
See application file for complete search history.

(56) References Cited

U.S. PATENT DOCUMENTS

| | | | |
|---|---|---|---|
| 4,897,855 A * | 1/1990 | Acampora | 375/245 |
| 6,188,346 B1 * | 2/2001 | Waho et al. | 341/156 |

OTHER PUBLICATIONS

S Pradham et al, "n-channel symmetric multiple descriptions—part I: (n.k) source-channel reassure codes," ITTT Trans. Information Theory, vol. 50, pp. 47-61, Jan. 2004.
R Puri et al, "n-channel symmetric multiple descriptions—part II: achievable rate-distortion region," ITTT Trans. Information Theory, vol. 51, pp. 1377-1392, Apr. 2005.

* cited by examiner

*Primary Examiner* — Jean B Jeanglaude
(74) *Attorney, Agent, or Firm* — Henry T. Brendzel

(57) ABSTRACT

An improved (N:K) multiple description binning encoder that employs binning yet permits recovery of the input signal when fewer than K of the descriptions are available. In creating the encoder, a first choice is made of the number of descriptions that the encoder is to create and the minimum number of descriptions below which full recovery of the input signal is not possible. A second choice is made as to the number of descriptions that are to be broken up, to form descriptions that have two portions each. Once the first choice is made, appropriate quantization and binning scheme are selected by employing conventional techniques, and in response to the second choice, the chosen number of descriptions are each quantization split into coarse and fine quantization arrangements.

8 Claims, 4 Drawing Sheets

FIG. 1
(PRIOR ART)
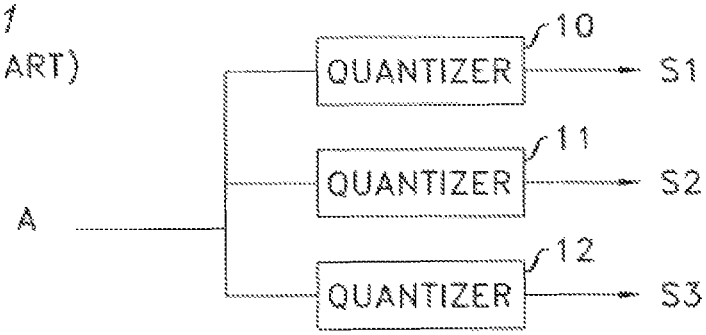
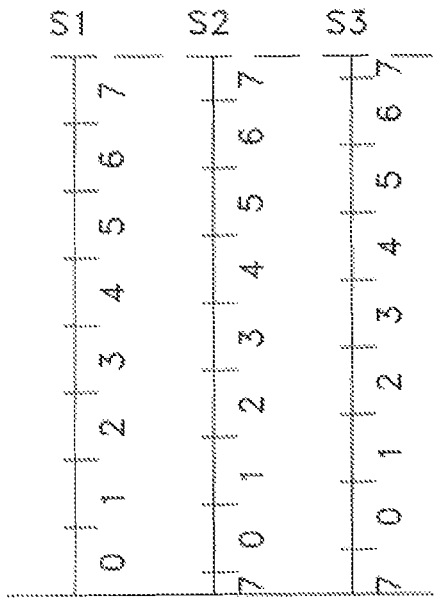
FIG. 2A
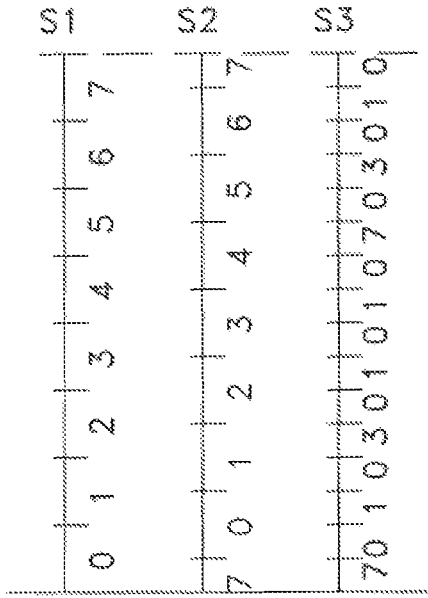
FIG. 2B
FIG. 3
(PRIOR ART)
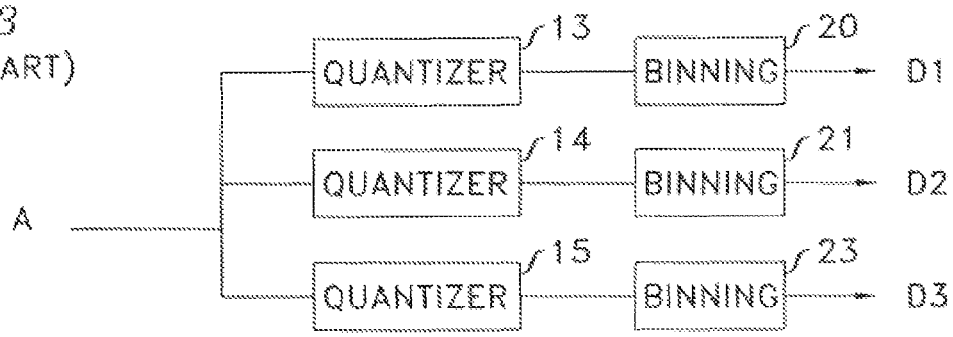

QUANTIZATION SPLITTING MULTIPLE DESCRIPTION ENCODER

BACKGROUND

This invention relates to encoders and, more particularly, to multiple description encoders.

FIG. 1 depicts encoders 10, 11, 12 that are responsive to an input signal, developing code signal streams S1, S2, and S3, respectively. Illustratively, encoders 10, 11 and 12 output 3 bit codes and are, in a sense, the same except for an offset. For example, encoder 10 outputs index 0 for signals, A, in the range $0 \leq s < u$, (where u is ⅛ of the signal's dynamic range M; i.e., $$u = \frac{M}{8})$$

and outputs index 1 in the range $u \leq s < 2u$, etc.; encoder 11 is offset by u/3, so it outputs index 0 in the range $$\frac{u}{3} \leq s < \frac{4u}{3}$$

and outputs index 1 in the range $$\frac{4u}{3} \leq s < \frac{7u}{3},$$

etc., and encoder 12 outputs is offset by $$\frac{2u}{3},$$

so it outputs index 0 in the range $$\frac{2u}{3} \leq s < \frac{5u}{3}$$

and outputs index 1 in the range $$\frac{5u}{3} \leq s < \frac{8u}{3},$$

etc. This is shown in FIG. 2A. In this arrangement, signal s can be decoded with granularity of $$\frac{u}{3}$$

when all three of the code streams S1, S2, and S3 are available for decoding. When only one of the code streams is available, the signal can still be coded, albeit, with granularity of only u, and when two of the steams are available, in some signal ranges the granularity is u, and in other signal ranges the granularity is $$\frac{u}{3}.$$

On average, the granularity is $$\frac{u}{2}.$$

The FIG. 1 arrangement can also be structured as a multiple description encoding arrangement that provides precisely the granularity $$\frac{u}{2}$$

by, for example, arranging encoder 12 to produce an output that is the Exclusive OR of encoders 10 and 11. This is shown in FIG. 2B. The encoded signal, A, can be recovered with granularity $$\frac{u}{2}$$

from signals S1 and S2. If one of those signals is not available but signal S3 is available, the encoded signal can still be recovered because the missing signal can be reconstituted from signal S3. In other words, the three-encoder arrangement where encoder 12 outputs the Exclusive Or of encoder 10 and 11 includes redundancy, and this redundancy permits recovery of the signal when one of the three code streams is missing.

FIG. 3 depicts a prior art encoder that transmits at a rate that is the same as that of the FIG. 1 encoder, but sends less information. This is accomplished by binning function elements 20, 21, and 22 that are connected at the outputs of encoders 13, 14, and 15, respectively. Each quantizer-binning element pair (such as quantizer 12 and binning element 23) can be viewed as a sub-encoder of the FIG. 3 encoder.

A binning function is a many-to-one mapping function and, consequently, the amount of information at the output is less than the amount of information at the input. Without more, this loss of information is not recoverable. One example of a binning function is a modulus truncation, where incoming codes are expressed in terms of their equivalents, modulo a preselected base, m, where m<M and M is the dynamic range of incoming codes. Each of the codes that a binning element is capable of producing can be viewed as a bin into which incoming codes are dropped (hence the term "binning").

It can be shown that the FIG. 3 embodiment that provides redundancy (such as where the third description is the Ex-Or of the other two descriptions), the incoming signal A can be recovered from descriptions D1, D2, and D3, even though, as indicated above, the binning information loses information. Proof of this capability is provided, for example, in "N-channel symmetric multiple descriptions—Part I: (n, k) source-channel erasure codes," Pradhan et al, *IEEE Trans. Information Theory*, vol. 50, pp. 47-61, January 2004. See, also "Source-Channel Erasure Codes with Lattice Codebooks for Multiple Description Coding," 2006 *IEEE International Symposium on Information Theory*, where Ostergaard, J. et al have shown that a subset of the rate distortion region of the symmetric N-channel multiple description coding problem can be achieved by use of (N:K) source-channel erasure codes (SCEC). That is, what the prior art has shown is that an encoder can be designed to produce N multiple descriptions that employ binning where decoding can be carried out if K or more of the multiple description are available, where K<N. Herein, such an encoder is termed an (N:K) multiple description binning encoder.

No arrangements are known that permit use of binning and also recovering of the input signal with fewer than K of the descriptions.

SUMMARY OF THE INVENTION

An advance in the art is realized with an (N:K) multiple description binning encoder that employs binning yet permits at least partial recovery of the input signal when fewer than K of the descriptions are available. This is achieved by quantization splitting a selected number of descriptions.

In creating the encoder, a first choice is made of the number of descriptions that the encoder is to create and the minimum number of descriptions below which full recovery of the input signal is not possible (i.e., the first choice is of the values of N and K). A second choice is made as to the number of descriptions that are to be broken up, to form descriptions that have two portions each, in order to permit some decoding even when fewer that K descriptions are available. Once the first choice is made, appropriate quantization and binning scheme are selected by employing conventional techniques, such as the linear Slepian-Wolf codes, and in response to the second choice, the chosen number of descriptions are each quantization split into coarse and fine quantization arrangements.

BRIEF DESCRIPTION OF THE DRAWING

FIG. 1 depicts a prior art encoder arrangement;
FIGS. 2A and 2B show two different quantization schemes for the FIG. 1 encoder;
FIG. 3 shows a prior art binning encoder.

DETAILED DESCRIPTION

Generally speaking, a signal stream can be encoded into N descriptions and, as indicated above, the prior art teaches that an (N:K) multiple description binning encoder like the one depicted in FIG. 3 can be created to result in an arrangement where decoding is possible even when only K descriptions are available, where K is a chosen integer less than N.

In accord with the principles of this invention, an encoder can be designed which (a) provides N descriptions, (b) employs binning, (c) permits full decoding when a predetermined number of descriptions, K<N, are available, and (d) permits at least some decoding even when only L>0 descriptions are available; and this is achieved by employing quantization splitting on L of the descriptions. The value of L is not greater than K, of course.

The principles of this invention are best applicable for N>2, N>K>1.

Figure 4:
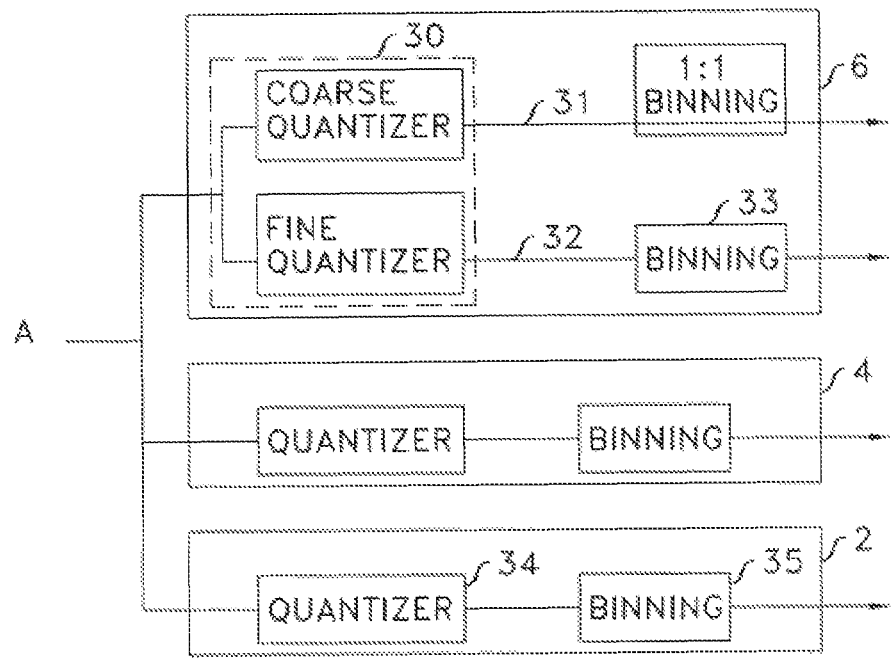
FIGS. 4-8 depict different embodiment of a binning encoder that incorporates the principles of this invention.

FIG. 4 depicts the structure of an embodiment where N=3, K=2, and L=1. What that means is that three descriptions are developed, that the binning is selected in accord with the teachings in the prior art to provide full decoding when two (K=2) of the descriptions are available, and since L=1 it means that the encoder of FIG. 4 is to permit partial decoding even if only one description is available, and it also means that 1 of the sub-encoders employs quantization splitting.

Thus, FIG. 4 has three sub-encoders (2, 4, and 6) that are responsive to an input signal A and all employ binning. Sub-encoder 6 provides the capability to do at least partial decoding even when only one description is available. Specifically, the description produced by sub-encoder 6 consists of two portions derived from a quantization splitting quantizer 30 that outputs fine quantization output on line 32, and coarse quantization output on line 31. The fine quantization output is applied to binning element 33 to produce the first portion of the sub-encoder 6 description. To enable the aforementioned partial decoding with a single description a 1:1 binning is employed on the out on line 31, which is a degenerative binning element that corresponds to is no binning at all and most easily implanted with an unadulterated path (e.g., a wire). This is illustrated in FIG. 4 with a 1:1 binning block drawn in dashed lines, and a line through it.

To give an example of coarse and fine quantizations that may be used in quantizers 31 and 32, when the dynamic range of signal A consists of 512 intervals, corresponding to 9 bits. Coarse quantizer 31 may be one that corresponds solely to the 2 most significant bits, and fine quantizer 32 may be one that corresponds to the 7 least significant bits. The structure of sub-encoders 2 and 4 follows the prior art, producing a description with binning element 35 that follows quantizer 34.

The binning chosen for sub-encoders 3, 4, and 6 is as taught in the prior art. See, for example, "Low-Complexity Approaches to Slepian-Wolf Near-Lossless Distributed Data Compression," Coleman, T. P. et al, *IEEE Transactions on Information Theory*, Volume 52, Issue 8, August 2006, pp 3546-3561 (Appendix B), or "Design of Slepian-Wolf codes by channel code partitioning," Stankovic, V. et al, *Proceedings of Data Compression Conference*, 2004, DCC 2004, pp 302-311.

Figure 5:
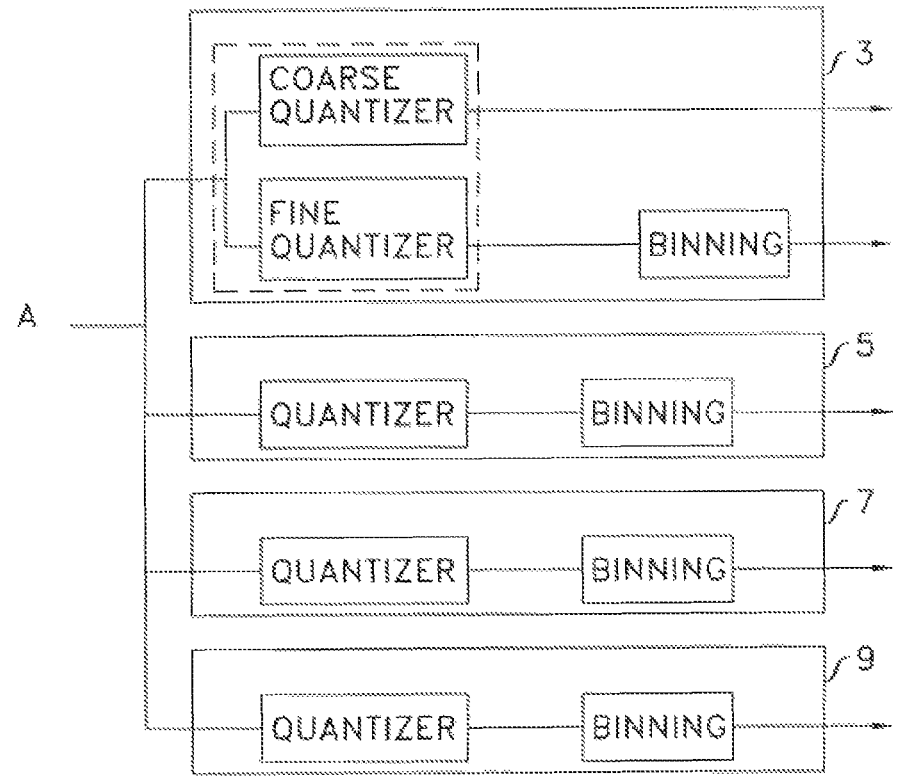

FIG. 5 presents an embodiment where N=4, K=2 and L=1. Since L=1, it means that one sub-encoder employs split quantization to create a description, with one quantizer providing coarse quantization of a particular quantization scheme and the other quantizer providing fine quantization of the same quantization scheme. This is implemented in sub-encoder 3. The remaining three sub-encoders (5, 7 and 9) are structurally similar to encoder 2. As in connection with FIG. 4, the specific binning for the FIG. 5 embodiment is chosen in accord with established prior art teachings.

Figure 6:
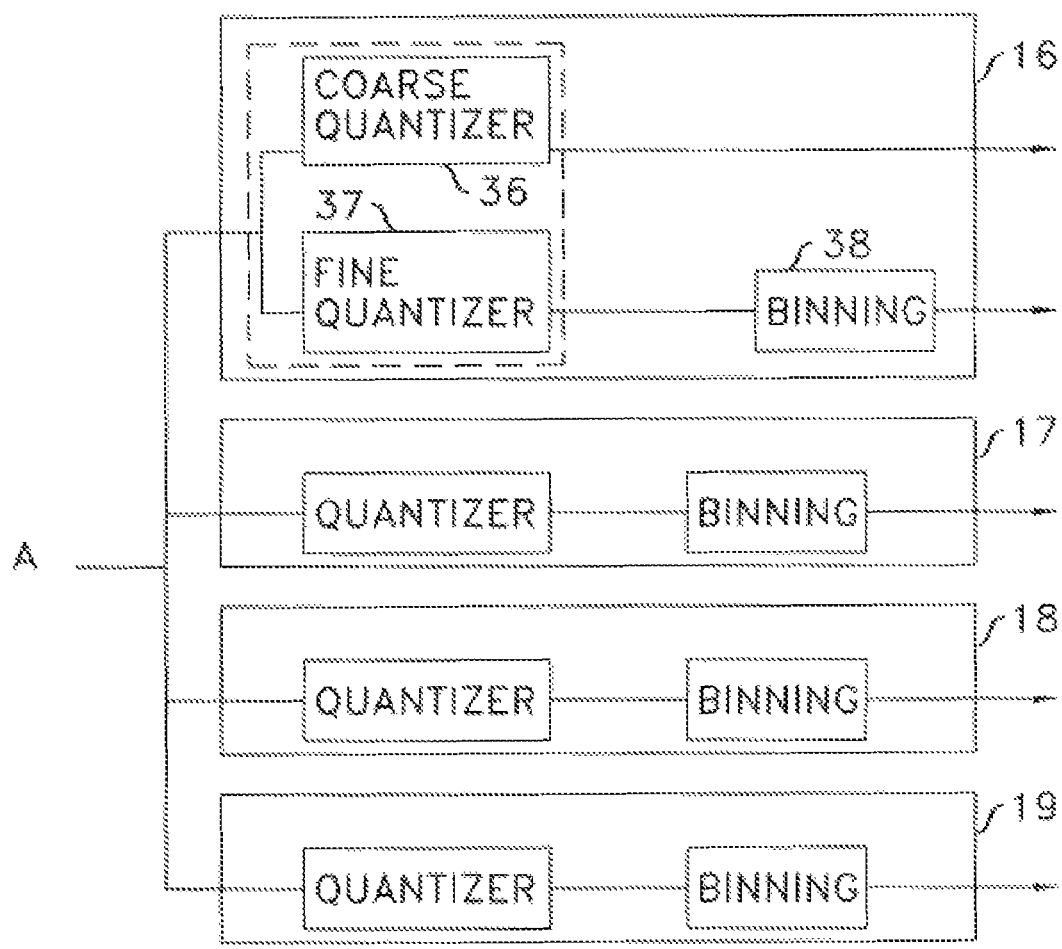

FIG. 6 presents an embodiment where N=4, K=3, and L=1. Since L=1, it means that at least partial decoding should be possible even with just one description, and which also means that there is only one sub-encoder that employs quantization splitting. Accordingly, sub-encoder 16 in FIG. 6 employs quantization splitting to obtain a description that has two portions, where one of the portions results from a coarse quantizer 36 whose output is not binned, and the other portion results from a fine quantizer 37 whose output is binned by element 38. The remaining sub-encoders of the FIG. 6 embodiment (17, 18, and 19) have the same structure as sub-encoder 2. As in connection with FIG. 4, the specific binning for the FIG. 6 embodiment is chosen in accord with established prior art teachings.

Figure 7:
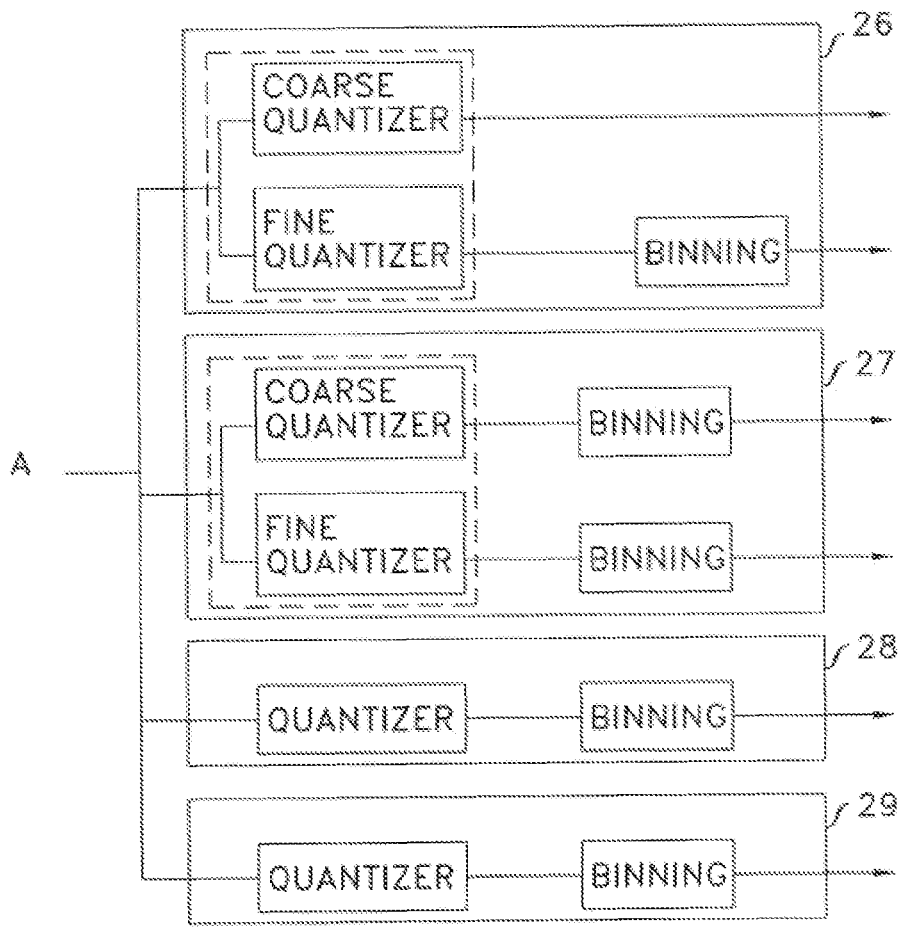

FIG. 7 presents an embodiment where N=4, K=3, and L=2. Since L=2, it means that it is desired to do at least partial decoding when there are two or more descriptions, and which also means that two sub-encoders employ quantization splitting. Accordingly, FIG. 7 contains sub-encoders 26 and 27 that employ quantization splitting. Since it is acceptable to insist on two descriptions before any decoding can take place, binning can be employed in both portions of each of the descriptions created by sub-encoders 26 and 27. Sub-encoders 28 and 29 have the same structure as sub-encoder 2. As in connection with FIG. 4, the specific binning for the FIG. 7 embodiment is chosen in accord with established prior art teachings.

It may be observed that in the embodiments disclosed above it is particular descriptions that must be present in order to perform the at least partial decoding with the minimum number of descriptions. For example, in the FIG. 4 embodiment it is the description produced by sub-encoder 6 that must be available to the decoder. In some applications, it is useful to effectively rotate the description that must be made available to the encoder, in accord with some selected timing scheme (e.g. cyclically).

Figure 8:
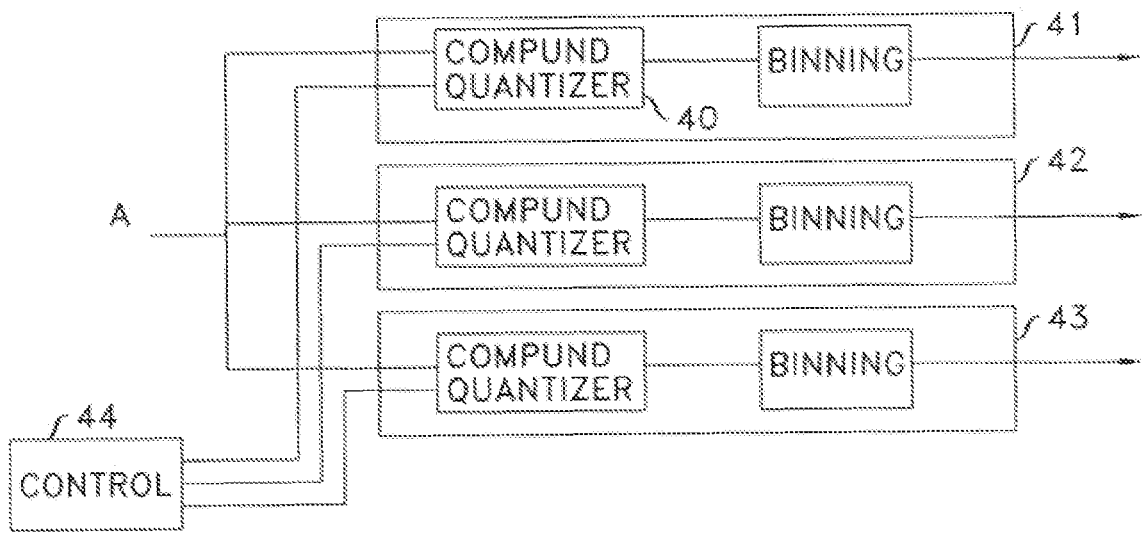

Illustratively, the FIG. 4 embodiment is constructed as illustrated in FIG. 8, where all of the sub-encoders can be controlled to either produce employ a single quantizer, or a pair of quantization splitting quantizers. To achieve this capability, each of sub-encoders 41, 42, and 43 has a compound quantizer 40 that, based on a control signal from control 44 either implements a quantizer like quantizer 34 in FIG. 4, or a quantizer like quantizer 30 in FIG. 4. It is also possible to have more than the minimum number of sub-encoders employ quantization splitting.

The above descriptions disclosed the principles of this invention via a number of illustrative embodiments. A more thorough mathematical treatment of the principles that underlie this invention is presented in Appendix A. Appendix B presents the Slepian-Wolf technique to designing the binning for the disclosed (and other) embodiments.

The invention claimed is:

1. An apparatus that encodes an incoming signal, producing N descriptions, where each of the descriptions is created by a sub-encoder that quantizes the incoming signal in accord with a quantization scheme that is unique to that sub-encoder, and bins results of the quantizing, and where the binning performed in the N sub-encoders is such that said input signal can be decoded when K<N descriptions are available, but no encoding is possible when fewer than K descriptions are available, characterized in that:
   each of L of said sub-encoders employs an element that operates as a quantization splitting quantizer that creates first and second outputs, where
   L is greater than 0,
   said first output corresponds to fine quantization,
   said second output corresponds to coarse quantization,
   said first output is applied to a first binning element that outputs a first portion of the sub-encoder description, and
   said second output is applied to a second binning element that outputs a second portion of the sub-encoder description when L>1, and said second output constitutes said portion of the sub-encoder description when L=1.

2. The apparatus of claim 1 where said element that operates as a quantization splitting quantizer comprises a first quantizer element that performs fine quantization and a second quantizer element that performs coarse quantization.

3. The apparatus of claim 2 where said second quantizer divides permissible dynamic range of said input signal into intervals, and said fine quantizer spots said signal within said intervals.

4. The apparatus of claim 1 where said element comprises two distinct quantizers.

5. An apparatus that encodes an incoming signal, producing N descriptions, where each of the descriptions is created by a sub-encoder that quantizes the incoming signal in accord with a quantization scheme that is unique to that sub-encoder, and bins results of the quantizing, and where the binning performed in the N sub-encoders is such that said input signal can be decoded when K<N descriptions are available, but no encoding is possible when fewer than K descriptions are available, characterized in that:
   each of L of said sub-encoders employs an element that operates as a quantization splitting quantizer that creates first and second outputs, where
   L is greater than 0,
   said first output corresponds to fine quantization,
   said second output corresponds to coarse quantization,
   said first output is applied to a first binning element that outputs a first portion of the sub-encoder description, and
   said second output is applied to a second binning element that outputs a second portion of the sub-encoder description, where said binning is 1:1 binning where L=1, is other than 1:1 binning when L>1.

6. An apparatus that encodes an incoming signal, producing N descriptions, where each of the descriptions, representative of said incoming signal, is created by a sub-encoder that quantizes the incoming signal in accord with a quantization scheme that is unique to that sub-encoder, and bins results of the quantizing, and where the binning performed in the N sub-encoders is such that said input signal can be decoded when K<N descriptions are available, but no encoding is possible when fewer than K descriptions are available, characterized in that:
   each of said sub-encoders:
      (a) employs an element that operates as a quantization splitting quantizer, when a sub-encoder control signal is at a first level, creating first and second outputs, where said first output corresponds to fine quantization, and said second output corresponds to coarse quantization, and where said first output is applied within said sub-encoder to a first binning element that outputs a first portion of the sub-encoder description, and said second output is applied within said sub-encoder to a second binning element that outputs a second portion of the sub-encoder description; and
      (a) employs a non-quantization splitting quantizer, when said sub-encoder control signal is at a second level, creating a single output, and said single output is applied within said sub-encode to a single binning element to produce said description of said sub-encoder; and
   means for applying said sub-encoder control signals to said sub-encoders.

7. The apparatus of claim 6 where said means for applying applies L<N control signals at said first level, and N-L control signals at said second level.

8. The apparatus of claim 6 where the sub-encoder control signal of each of the sub-encoders alternates with time between said first level and said second level.

\* \* \* \* \*